Nov. 26, 1946.  W. D. HERSHBERGER  2,411,572
PULSE ECHO SYSTEM
Filed June 25, 1941
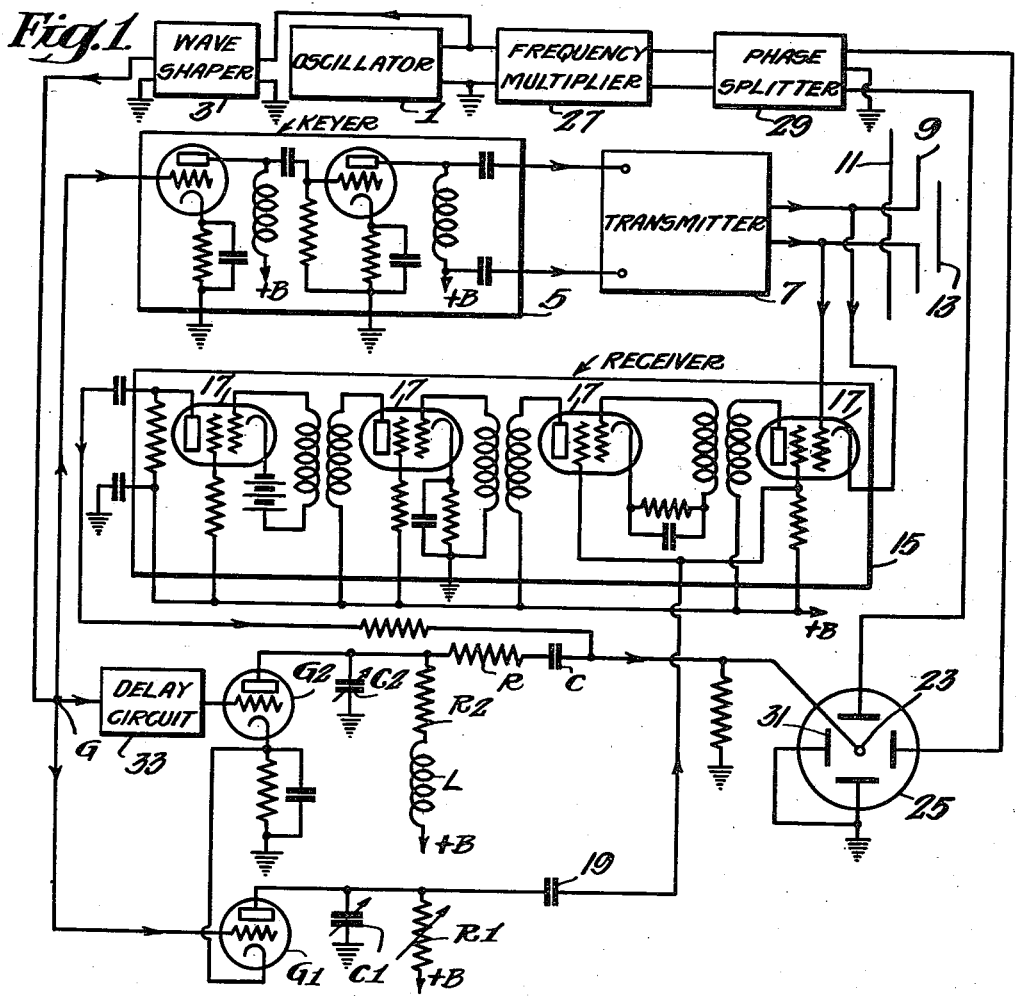
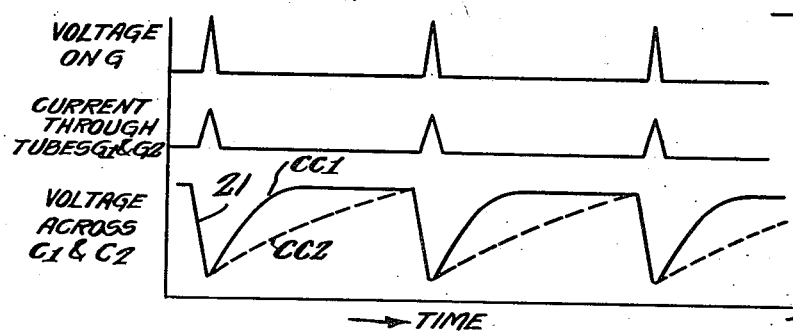
Inventor
William D. Hershberger
By
Attorney Patented Nov. 26, 1946

2,411,572

UNITED STATES PATENT OFFICE 2,411,572

PULSE ECHO SYSTEM

William D. Hershberger, Haddonfield, N. J., assignor to Radio Corporation of America, a corporation of Delaware Application June 25, 1941, Serial No. 399,607

8 Claims. (Cl. 250—1)

This invention relates to improvements in pulse echo receiving devices and particularly to means for controlling the receiver sensitivity and the scanning movements of the cathode ray indicator of such systems.

In pulse echo systems, a pulse of energy is radiated toward a wave reflecting object. The reflected pulses may be received and applied to a cathode ray tube provided with scanning means. In such systems, it is desirable to regulate the receiver sensitivity so that the receiver will not be blocked by the outgoing pulses or very strong echo signals from nearby objects. Furthermore, since the cathode ray trace may be calibrated to indicate the distance of the reflecting object, it is desirable to provide a long scale so that the distances may be read easily and accurately.

One of the objects of the invention is to provide improved means for varying the sensitivity of a pulse echo receiver according to a predetermined time function. Another object is to provide simplified means for forming a spiral trace in the cathode ray indicator of a pulse echo system. An additional object is to provide means for deriving synchronously, from the timing oscillator of a pulse echo system, voltages of the desired wave form for controlling the sensitivity of the pulse receiver and for controlling the sweep of the pulse echo indicator.

The invention will be described by referring to the accompanying drawing in which Figure 1 is a schematic circuit diagram of one embodiment of the invention; and Figure 2 is a graph showing the wave forms of the voltages deriving in accordance with the invention.

Referring to Fig. 1, a timing oscillator 1 is connected through a wave shaper 3, which may be a non-linearly responsive device, and a keyer 5 to a transmitter 7. The output of the transmitter is applied to an antenna 9, which is preferably made directive by a reflector 11 and a director 13 or the equivalent. The antenna 9 may be connected, according to the copending application Serial No. 184,354, filed January 11, 1938, by Wolff and Hershberger, for "improvement in Signalling system," to a receiver 15 or a separate receiving antenna may be used.

The receiver 15 may be of the radio frequency or superheterodyne type employing thermionic amplifiers and detectors 17. In the present arrangement, screen grid tubes have been used because their sensitivities are readily controlled by applying voltages to the screens in the following manner: Pulse voltages at the point G are applied to a vacuum tube G1, which is biased to cut-off. The anode circuit of the tube includes a capacitor C1 and a resistor R1. The anode is connected through a capacitor 19 to one or more of the screen grids of the tubes 17 of the receiver. When the tube G1 is blocked, the capacitor C1 is charged by the anode voltage applied through the anode resistor R1. The charging may follow the curve marked CC1 of Fig. 2. When the pulse from wave shaper 3 is applied to make the point G positive, the tube G1 becomes conductive and very rapidly discharges the capacitor C1 as shown by the steep line 21. This applies a negative voltage to the screen grids of the receiver tubes 17 and makes the receiver sensitivity approach zero. As the capacitor C1 is charged, the receiver sensitivity is increased because the screen grid potentials are restored to their normal value. The restoration of receiver sensitivity may be made according to a desired predetermined rate. It should be understood that other than screen grid tubes may be used and the controlling voltages applied to electrodes other than screen grids.

The received signals are amplified and are applied to a radial deflecting electrode 23 of the cathode ray tube 25. In order that a long scale may be provided in a tube of limited size spiral deflecting voltages are generated and applied as follows: The currents from the oscillator 1 are applied to a frequency multiplier 27. The currents of multiplied frequency are converted into a two phase current by a phase splitter 29, which may consist of a conventional reactive and resistive network: The two phase current is applied to the deflecting elements 31 of the cathode ray tube to produce a circular sweep.

The circular sweep is converted into a spiral by applying voltages of more or less sawtooth wave form, illustrated by the curve CC2 of Fig. 2. The sawtooth voltages are applied in synchronism with the outgoing pulses by applying the positive pulse voltages at G, through delay network 33, to a tube G2 biased to cut-off. The anode of tube G2 is connected to a capacitor C2 and a resistor R2, which is connected through a shaping inductor L to the plus B voltage. The anode potentials are applied through an isolating network RC to the radial deflecting electrode 23 of the cathode ray tube 25.

As thus arranged for each outgoing pulse, a sensitivity control voltage, a radial deflecting voltage and a circular sweep voltage of appropriate frequency are derived. The sensitivity control voltage is applied to the pulse echo receiver to diminish its sensitivity during the radiation of the outgoing pulse and to restore gradually the receiver sensitivity until full sensitivity is reached for receiving pulse echoes from the more distant objects. The circular sweep and radial deflecting voltages are applied to deflect the cathode ray of the indicator along a spiral path. The spiral path is swept once for each outgoing pulse and may be calibrated in terms of distance. The delay circuit 33 is provided so that the phase of spiral sweep may be adjusted with respect to the outgoing pulses and zero of the calibration.

I claim as my invention:

1. A pulse echo system including a transmitter, a receiver, a cathode ray tube having deflecting electrodes and a radial deflecting electrode, means for applying to said transmitter a current of predetermined frequency to produce pulse signals, means for multiplying the frequency of said current, means for applying said current of multiplied frequency to said deflecting electrodes to produce circular rotation of said ray, a pair of electrical networks respectively having different charging voltage characteristics, means for applying said pulse producing current to discharge said electrical networks, means for applying the charging voltage of one of said networks to vary the sensitivity of said receiver, and means for applying the charging voltage of the other of said networks and the echo signal output voltage of said receiver to said radial deflecting electrode to produce respectively spiral deflections of said ray and echo signal indications.

2. A pulse echo system including a transmitter, a receiver, a cathode ray indicator including deflecting electrodes and a radial deflecting electrode, means for keying said transmitter with a current of predetermined frequency, means for multiplying said keying frequency current, means for applying said current of multiplied frequency to said deflecting electrodes to produce circular rotation of said ray, a pair of electrical networks having predetermined charging and discharging voltage characteristics, means for applying said keying current to discharge said electrical networks, means for applying one of said charging voltages to regulate the sensitivity of said receiver, and means for applying the other of said charging voltages and the output of said receiver to said radial deflecting electrode to produce respectively spiral deflections of said ray and echo signal indications.

3. A pulse echo system including a transmitter, a receiver, a cathode ray tube having ray deflecting electrodes and a radial deflecting electrode, a source of alternating current, a keyer connected to said source and to said transmitter for producing pulse signals, means for multiplying the frequency of said alternating current, means for deriving a two-phase current from said frequency multiplied current, means for applying said two-phase current to said deflecting electrodes to produce circular rotation of said ray, a pair of electrical networks respectively having different charging voltage characteristics, means including said keyer for discharging abruptly said electrical networks, means for applying the charging voltage from one of said networks to regulate the sensitivity of said receiver, and means for applying the output echo signal voltages from said receiver and the charging voltage of the other of said networks to said radial deflecting electrode respectively to produce echo signal indications and to convert said circular movement into a spiral movement.

4. A pulse echo system including a transmitter, a receiver, a cathode ray tube having ray deflecting electrodes and a radial deflecting electrode, a source of alternating current, a keyer connected to said source and to said transmitter for producing pulse signals, means for multiplying the frequency of said alternating current, means for deriving a two-phase current from said frequency multiplied current, means for applying said two-phase current to said deflecting electrodes to produce circular rotation of said ray, a pair of electrical networks respectively having different charging voltage characteristics, means including said keyer for discharging said electrical networks abruptly and in synchronism with said pulse signals, means for applying the charging voltage from one of said networks to regulate the sensitivity of said receiver in synchronism with said pulse signals, and means for applying the output echo signal voltages from said receiver and the charging voltage of the other of said networks to said radial deflecting electrode respectively to produce echo signal indications and to convert said circular movement into a spiral movement starting in synchronism with said pulse signals.

5. A pulse echo system including a transmitter, a receiver, a cathode ray tube having deflecting electrodes and a radial deflecting electrode, means for applying to said transmitter a current of predetermined frequency to produce pulse signals, means for multiplying the frequency of said current, means for applying said current of multiplied frequency to said deflecting electrodes to produce circular rotation of said ray, a pair of electrical networks respectively having different charging voltage characteristics, means for applying said pulse-producing current to discharge said electrical networks in synchronism with said pulse signal production, means for applying the charging voltage of one of said networks to vary the sensitivity of said receiver in synchronism with said pulse signals, and means for applying the charging voltage of the other of said networks and the echo signal output voltage of said receiver to said radial deflecting electrode to produce respectively spiral deflections of said ray and echo signal indications.

6. A system according to claim 2 including a delay circuit interposed between one of said electrical networks and said keying means for synchronizing said spiral deflections with said transmitter keying.

7. A system according to claim 1 including a delay circuit interposed between one of said electrical networks and said keying means for delaying the start of said spiral deflections with respect to said pulse production.

8. A pulse echo system including a transmitter, a receiver, a cathode ray tube having ray deflecting electrodes and a radial deflecting electrode, a source of alternating current, a keyer connected to said source and to said transmitter for producing pulse signals, means for multiplying the frequency of said alternating current, means for deriving a two-phase current from said frequency multiplied current, means for applying said two-phase current to said deflecting electrodes to produce circular rotation of said ray, means including a pair of thermionic tubes having input and output circuits, said output circuits respectively including electrical networks having different charging voltage characteristics, means for applying voltages derived from said keyer to the input circuits of said tubes to discharge said electrical networks, means for applying the charging voltage from one of said networks to regulate the sensitivity of said receiver, and means for applying the output echo signal voltages from said receiver and the charging voltage of the other of said networks to said radial deflecting electrode respectively to produce echo signal indications and to convert said circular movement into a spiral movement.

WILLIAM D. HERSHBERGER.